ns009228833B2

United States Patent
Zeng

(10) Patent No.: US 9,228,833 B2
(45) Date of Patent: Jan. 5, 2016

(54) WIDE BASELINE BINOCULAR OBJECT MATCHING METHOD USING MINIMAL COST FLOW NETWORK

(75) Inventor: Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 577 days.

(21) Appl. No.: 13/535,538

(22) Filed: Jun. 28, 2012

(65) Prior Publication Data

US 2014/0002650 A1 Jan. 2, 2014

(51) Int. Cl.
G01C 11/06 (2006.01)
H04N 13/02 (2006.01)
H04N 13/00 (2006.01)
G06K 9/00 (2006.01)

(52) U.S. Cl.
CPC .......... *G01C 11/06* (2013.01); *G06K 9/00791* (2013.01); *H04N 13/0007* (2013.01); *H04N 2013/0092* (2013.01)

(58) Field of Classification Search
None
See application file for complete search history.

(56) References Cited

U.S. PATENT DOCUMENTS

| 6,046,763 | A * | 4/2000 | Roy ................................. 348/47 |
| 6,421,463 | B1 * | 7/2002 | Poggio et al. ................. 382/224 |
| 7,403,659 | B2 * | 7/2008 | Das et al. ....................... 382/224 |
| 7,805,388 | B2 * | 9/2010 | Weston et al. .................. 706/20 |
| 8,009,897 | B2 * | 8/2011 | Xu et al. ......................... 382/154 |
| 8,139,109 | B2 * | 3/2012 | Schmiedel et al. ........... 348/118 |
| 8,566,761 | B2 * | 10/2013 | Xiang et al. ................... 716/102 |
| 2009/0169052 | A1 * | 7/2009 | Seki et al. ...................... 382/103 |
| 2010/0097457 | A1 * | 4/2010 | Zhang et al. ................... 348/119 |

OTHER PUBLICATIONS

Y. Boykov, An Experimental Comparison of Min-Cut/Max-Flow Algorithms for Energy Minimization in Vision, IEEE Transactions on Pattern Analysis and Machine Intelligence, vol. 26, No. 9, pp. 1124-1137 (Sep. 2004).*

* cited by examiner

*Primary Examiner* — William C Vaughn, Jr.
*Assistant Examiner* — Lindsay Uhl

(57) ABSTRACT

A method for tracking a target object utilizing a binocular system includes capturing first and second images, the first image captured from a first camera device and the second image captured from a second camera device. A plurality of image patches are applied to the first and second images and a plurality of detection costs each associated with respective ones of the image patches applied to the first and second images is determined. A plurality of matching costs each corresponding to respective ones of selected matching pairs of image patches between the first and second images is determined. At least one cost flow path is determined from a source vertex of the first image to a sink vertex of the second image based on the detection costs and the matching costs and the target object is tracked based on the at least one cost flow path.

14 Claims, 5 Drawing Sheets

WIDE BASELINE BINOCULAR OBJECT MATCHING METHOD USING MINIMAL COST FLOW NETWORK

TECHNICAL FIELD

This disclosure is related to object detection and matching using a binocular camera system

BACKGROUND

The statements in this section merely provide background information related to the present disclosure. Accordingly, such statements are not intended to constitute an admission of prior art.

Active Safety and Driver Assistance Systems (ASDAS) utilize monocular vision systems as a low-cost solution for detecting a target object, such as a leading vehicle traveling along a roadway. Monocular vision systems estimate depth based on a flat ground assumption. However, when the flat ground assumption does not hold true, the depth estimation deviates from its true value. For instance, the monocular vision system may estimate the range to a target object to be further away than the target object actually is when the flat ground assumption does not hold true.

It is known, for example, to utilize range detection devices such as radar and lidar to detect the presence and range to a target object. However, such range detection devices are costly, increasing the price of a vehicle equipped with ASDAS.

It is further known, for example, to utilize stereo imaging approaches to determine the presence of a target object by extracting three-dimensional features from a disparity map of two captured images, each from a respective camera device, and matching a sparse set of key points. However, such stereo imaging approaches suffer from depth inaccuracy due to a narrow baseline between the two camera devices because depth accuracy degrades quadratically with depth. Additionally, pixel correspondence issues resulting in an unusable disparity map can occur when the baseline between the two camera devices is increased.

Accordingly, it is desirable to improve the depth accuracy using stereo imaging without extracting three-dimensional features that require the use of disparity maps.

SUMMARY

A method for tracking a target object utilizing a binocular system includes capturing first and second images, the first image captured from a first camera device and the second image captured from a second camera device. A plurality of images are applied to the first and second images and a plurality of detection costs each associated with respective ones of the image patches applied to the first and second images is determined. A plurality of matching costs each corresponding to respective ones of selected matching pairs of image patches between the first and second images is determined. At least one cost flow path is determined from a source vertex of the first image to a sink vertex of the second image based on the detection costs and the matching costs and the target object is tracked based on the at least one cost flow path.

BRIEF DESCRIPTION OF THE DRAWINGS

One or more embodiments will now be described, by way of example, with reference to the accompanying drawings, in which.

DETAILED DESCRIPTION

Figure 1:
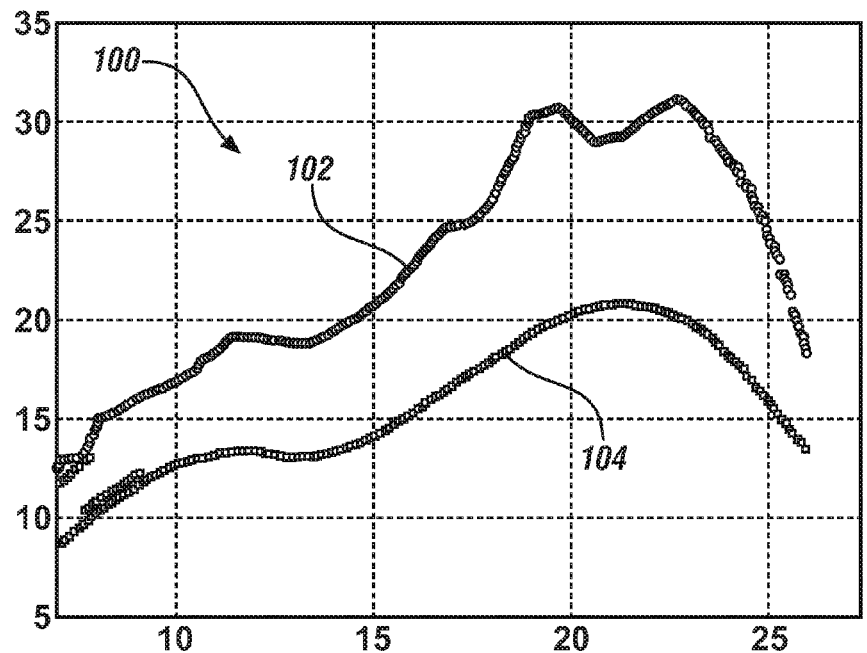
FIG. 1 illustrates experimental and derived data of a monocular camera device and a radar device depicting range measurements to a target object on a curved road surface, in accordance with the present disclosure.

Referring now to the drawings, wherein the showings are for the purpose of illustrating certain exemplary embodiments only and not for the purpose of limiting the same, FIG. 1 graphically illustrates a plot 100 of experimental and derived data of a monocular camera device and a radar device depicting range measurements to a target object on a curved road surface, in accordance with the present disclosure. The horizontal axis denotes a test time in seconds and the vertical axis denotes distance in meters to the target object. The plot 100 depicts an estimated range measurement profile 102 to the target object using a monocular camera device and an actual range measurement profile 104 to the target object using a radar device having an accuracy within decimeters. Target object detection using radar devices can be referred to as a ground truth giving an actual range to the target object, or a range as close as possible to the accurate range. It will be appreciated that a flat ground assumption is violated because the target object is upon the curved road surface, and therefore, a significant deviation exists between the estimated range measurement profile 102 and the actual measurement profile 104 due to the violation of the flat ground assumption.

Figure 2:
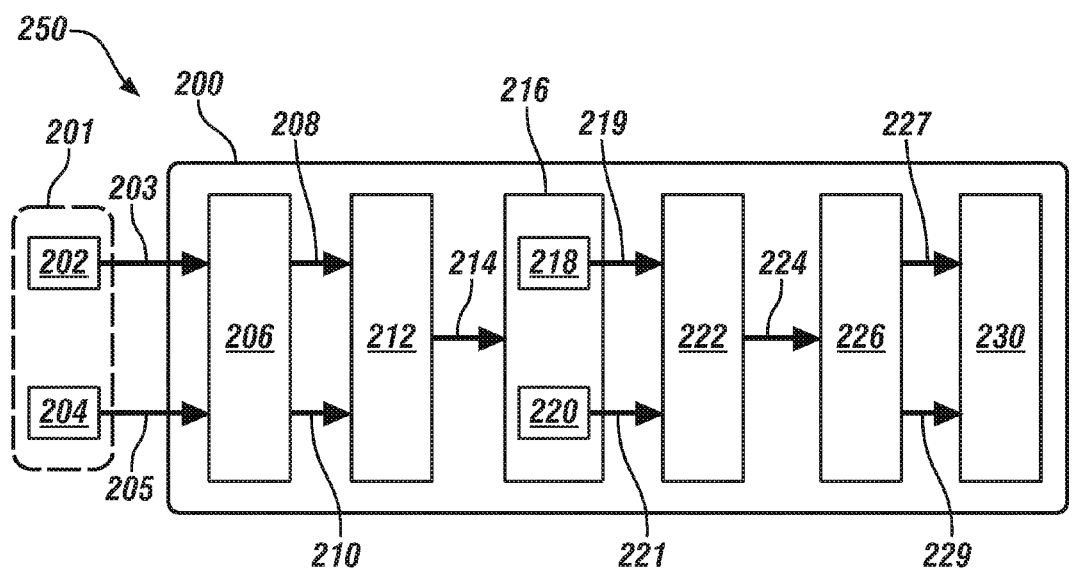
FIG. 2 illustrates an exemplary Active Safety and Driver Assistance System (ASDAS) utilizing a binocular camera system for tracking a target object, in accordance with the present disclosure.

FIG. 2 illustrates an exemplary Active Safety and Driver Assistance System (ASDAS) 250 utilizing a binocular camera system 201 and an object detection and matching (ODM) module 200 for tracking a target object, in accordance with the present disclosure. The ASDAS 250 is located within a source vehicle. This disclosure is not limited to the section or compartment of the source vehicle that the ASDAS 250 is located. As will become apparent, utilization of the binocular camera system 201 having a wide baseline in association with the exemplary ODM module 200 allows for accurate range estimation to the target object when a flat ground assumption is violated without extracting three-dimensional features from a disparity map. Tracking the target object can include at least one of estimating the range to a leading target vehicle and estimating a velocity of the leading target vehicle.

Figure 3:
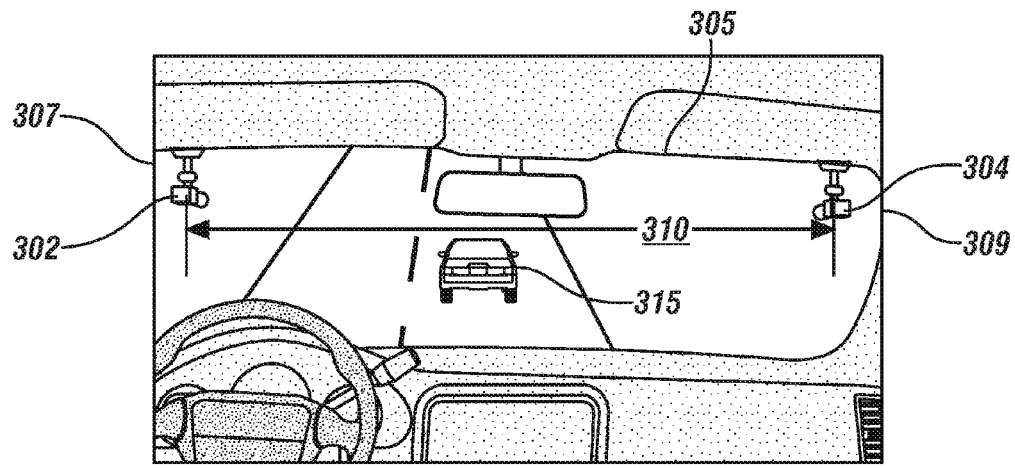
FIG. 3 illustrates an exemplary binocular camera system having a wide baseline including a first camera device mounted proximate to a first end of a source vehicle windshield and a second camera device mounted proximate a second end of the source vehicle windshield, in accordance with the present disclosure.

Referring to FIG. 3, an exemplary binocular camera system is illustrated having a wide baseline 310 including a first camera device 302 and a second camera device 304, in accordance with the present disclosure. The first camera device 302 is mounted proximate to a first end 307 (e.g., left-side) of a source vehicle windshield 305 and proximate to a driver-side A-pillar. Accordingly, the first camera device 302 can be referred to as a driver-side camera device. The second camera device 304 is mounted proximate to a second end 309 (e.g., right-side) of the source vehicle windshield 305 and proximate to a passenger-side A-pillar. Accordingly, the second camera device 304 can be referred to as a passenger-side camera device. Hence, the binocular camera system having the wide baseline 310 is able to provide for stereo imaging to increase the accuracy of depth and range estimation. In an exemplary embodiment, the wide baseline 310 is about two meters. It will be appreciated that range estimation accuracy is increased as the width of the baseline 310 between the first and second camera devices 302, 304, respectively, increases. Each of the first and second camera devices 302, 304, respectively, are configured to capture respective images of a road scene in front of the vehicle including a target object 315, such as a target vehicle, traveling on the road scene. The first and second camera devices 302, 304, respectively, can each be referred to as frontward camera devices. It will be appreciated that embodiments discussed herein can be similarly implemented to a binocular camera system using two rearward camera devices.

The exemplary ODM module 200 receives first and second images 203, 205, respectively, from the binocular camera system 201. The binocular camera system 201 includes a first camera device 202 and a second camera device 204. The first camera device 202 can include one of a driver-side camera device and a passenger-side camera device and the second camera device 204 includes the other one of the right-side camera device and the left-side camera device. The first image 203 is captured from the first camera device. For simplicity, the first image 203 corresponds to a driver-side image captured from the first camera device including the driver-side camera device. The second image 205 is captured from the second camera device. For simplicity, the second image 205 corresponds to a passenger-side image captured from the second camera device including the passenger-side camera device. In an exemplary embodiment, the first camera device 202 corresponds to the first camera device 302 of FIG. 3 and the second camera device 204 corresponds to the second camera device 304 of FIG. 3.

The ASDAS 250 includes the binocular camera system 201, the ODM module 200 and a vehicle control module 230. The ODM module 200 includes an image patch detection module 206, a flow network module 212, a cost module 216, a cost flow module 222 and a tracking module 226. The cost module 216 further includes a detection cost module 218 and a matching cost module 220. The tracking module 226 is configured to track or estimate the range 227 to the target object and/or the velocity of the target object. The vehicle control module 230 is configured to autonomously or semi-autonomously control the source vehicle based on the tracking of the target object. For instance, the vehicle control module 230 may send a braking request to slow the source vehicle down if the target object is inside a predetermined range or traveling below a predetermined velocity.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

Figure 4:
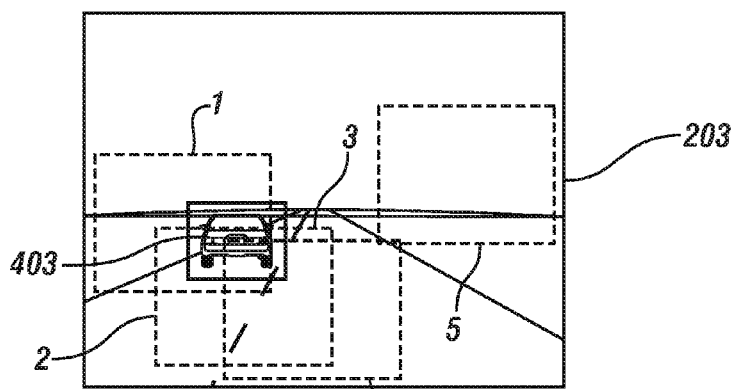
FIG. 4 illustrates a first image captured from the first camera device of FIG. 3 and a plurality of image patches applied to the first image, in accordance with the present disclosure.
Figure 5:
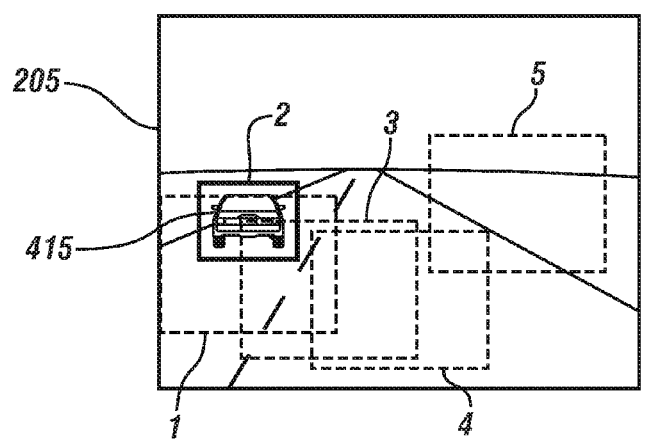
FIG. 5 illustrates a second image captured from the second camera device of FIG. 3 and a plurality of image patches applied to the second image, in accordance with the present disclosure.

Referring to FIG. 4, the first image 203 is illustrated including a target object 403 (e.g., target object 315 of FIG. 3) on the driving scene ahead of the source vehicle. In an exemplary embodiment, the first image 203 is a driver-side image captured from a driver-side camera device that is mounted proximate to a driver-side of the source vehicle windshield and proximate to a driver-side A-pillar. Referring to FIG. 5, the second image 205 is illustrated including a target object 415 (e.g., target object 315 of FIG. 3) on the driving scene ahead of the source vehicle. In an exemplary embodiment, the second image 205 is a passenger-side image captured from a passenger-side camera device that is mounted proximate to a passenger-side of the source vehicle windshield and proximate to a passenger-side A-pillar.

The image patch detection module 206 receives the first and second images 203, 205, respectively, from the binocular camera system 201. A predetermined number of image patches 208 are applied to the first image 203 and received by the flow network module 212. Similarly, a predetermined number of image patches 210 are applied to the second image 205 and received by the flow network module 212. Each of these image patches indicates a candidate enclosing an object of interest (e.g., a target object including a leading target vehicle in this embodiment). In an exemplary embodiment, with reference to FIGS. 4 and 5, the image patch detection module 206 applies a plurality of image patches 1, 2, 3, 4, 5 to each of the first and second images 203, 205, respectively. Hence, the predetermined number of image patches 208 corresponds to the image patches 1, 2, 3, 4, 5 applied to the first image 203 illustrated in FIG. 4 and the predetermined number of image patches 210 corresponds to the image patches 1, 2, 3, 4, 5 applied to the second image 205 illustrated in FIG. 5. Each image patch 1, 2, 3, 4, 5 applied to the first image 203 includes a rectangular box having a discrete size and location with respect to the first image 203 and each image patch 1, 2, 3, 4, 5 applied to the second image 205 includes a rectangular box having a discrete size and location with respect to the second image 205. It will be appreciated that the same predetermined number of image patches will be applied to each of the first and second images 203, 205, respectively. Each image patch 1, 2, 3, 4, 5 can be referred to as an object candidate. Discussed in greater detail below with reference to the detection cost module 218, each of the image patches can be assigned as one of occupied or unoccupied with a target object based on the detection cost in each of the image patches 1, 2, 3, 4, 5. To determine whether an image patch is one of occupied or unoccupied with a target object, each image patch can be compared to an object template accounting for perspectives of the target object such as a passenger vehicle. For instance, each image patch can be compared to one of six templates representing different perspectives of passenger vehicles.

The flow network module 212 receives the predetermined number of image patches 208 applied to the first image 203 and the predetermined number of image patches 210 applied to the second image 205. The flow network module 212 generates a four-layer directed graph 214 for eventually determining a cost flow path from a source vertex of the first image to a sink vertex of the second image based on detection costs and matching costs associated with the image patches.

Figure 6:
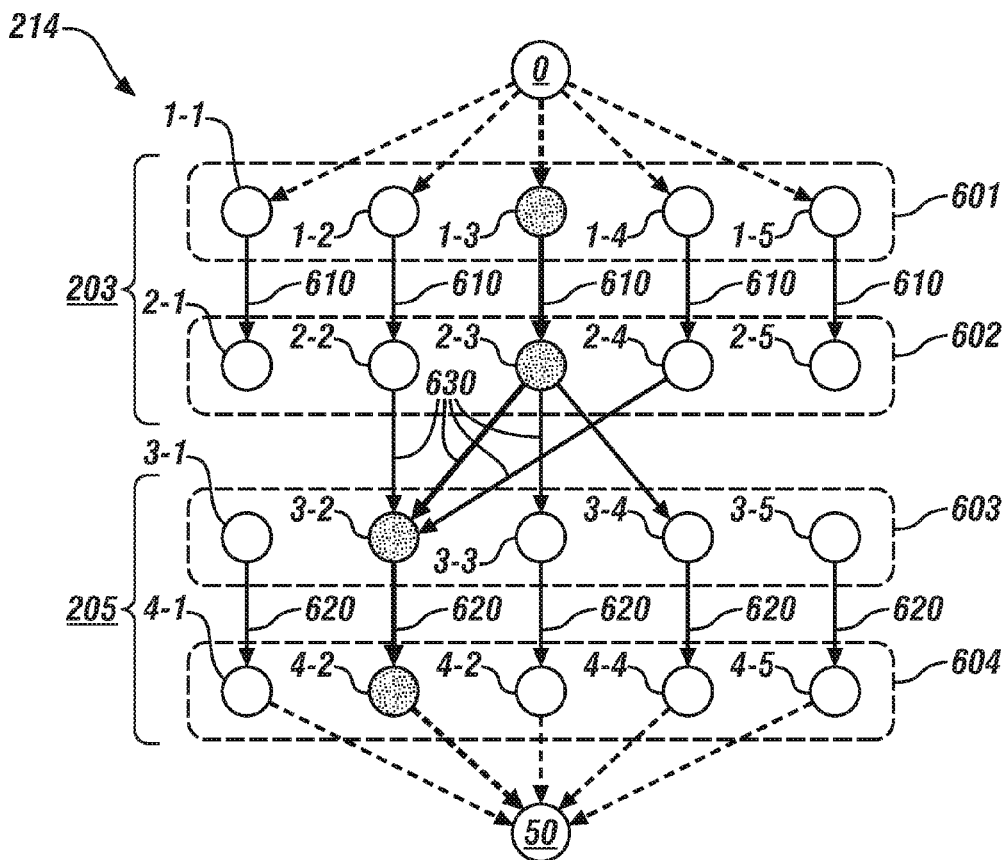
FIG. 6 illustrates an exemplary four-layer directed graph of the first image of FIG. 4 and the second image of FIG. 5 for determining a cost flow path from a source vertex of the first image to a sink vertex of the second image based on detection costs and matching costs associated with the image patches, in accordance with the present disclosure.

Referring to FIG. 6, the four-layer directed graph 214 includes the first image 203 having two layers including a first layer 601 and a second layer 602. The four-layer directed graph 214 further includes the second image 205 having two layers including a third layer 603 and a fourth layer 604. The image patches 208 applied to the first image 203 are enumerated as 1-1, 1-2, 1-3, 1-4, 1-5 for all possible image patches of the first layer 601. Hence, the enumerated image patches 1-1, 1-2, 1-3, 1-4, 1-5 are vertices of the first layer 601 and correspond to respective ones of image patches 1, 2, 3, 4, 5, respectively, applied to the first image 203 illustrated in FIG. 4. The image patches 208 applied to the first image 203 are further enumerated as 2-1, 2-2, 2-3, 2-4, 2-5 for all possible image patches of the second layer 606. Hence, the enumerated image patches 2-1, 2-2, 2-3, 2-4, 2-5 are vertices of the second layer 602. The second layer 602 is regarded as a shadow of the first layer 601, and therefore, the second layer 602 includes an identical structure as the first layer 601. Therefore, each of the plurality of image patches 1, 2, 3, 4, 5 applied to the first image 203 is represented by a first layer 601 and a second layer 602 of the first image 203. An arc between respective enumerated image patches of each of the first and second layers 601, 602, respectively, represents a detection cost $\zeta_\alpha$ 610. For instance, detection costs $\zeta_\alpha$ 610 are determined on each of the arcs between 1-1 and 2-1; 1-2 and 2-2; 1-3 and 2-3; 1-4 and 2-4; and 1-5 and 2-5. In other words, a plurality of detection costs $\zeta_\alpha$ 610 are determined each associated with respective ones of the image patches applied to the first image 203. Determining the detection costs $\zeta_\alpha$ 610 is discussed in greater detail below with reference to the cost module 216.

The image patches 210 applied to the second image 205 are enumerated as 3-1, 3-2, 3-3, 3-4, 3-5 for all possible image patches of the third layer 603. Hence, the enumerated image patches 3-1, 3-2, 3-3, 3-4, 3-5 are vertices of the third layer 603 and correspond to respective ones of image patches 1, 2, 3, 4, 5, respectively, applied to the second image 205 illustrated in FIG. 5. The applied image patches 210 to the second image 205 are further enumerated as 4-1, 4-2, 4-3, 4-4, 4-5 for all possible image patches of the fourth layer 604. Hence, the enumerated image patches 4-1, 4-2, 4-3, 4-4, 4-5 are vertices of the fourth layer 604. The fourth layer 604 is regarded as a shadow of the third layer 603, and therefore, the fourth layer 604 includes an identical structure as the third layer 603. Therefore, each of the plurality of image patches 1, 2, 3, 4, 5 applied to the second image 205 is represented by a third layer 603 and a fourth layer 604 of the second image 205. An arc between respective enumerated image patches of each of the third and fourth layers 603, 604, respectively, represents a detection cost $\zeta_\beta$ 620. For instance, detection costs $\zeta_\beta$ 620 are determined on each of the arcs between 3-1 and 4-1; 3-2 and 4-2; 3-3 and 4-3; 3-4 and 4-4; and 3-5 and 4-5. In other words, a plurality of detection costs $\zeta_\beta$ 620 are determined each associated with respective ones of the image patches applied to the second image 205. Determining or calculating the detection costs $\zeta_\beta$ 620 is discussed in greater detail below with reference to the cost module 216.

Arcs incident between enumerated image patches represented by the second and third layers 602, 603, respectively, represent possible matches between image patches applied to the first image 203 and image patches applied to the second image 205. A matching cost $\mu_{\alpha\beta}$ 630 represents the cost of possible matches between image patches applied to the first image 203 and image patches applied to the second image 205. For instance, matching costs $\mu_{\alpha\beta}$ 630 are determined on each of the arcs between 2-2 and 3-2; 2-3 and 3-2; 2-3 and 3-3; 2-3 and 3-4; and 2-4 and 3-2. In other words, a plurality of matching costs are determined each corresponding to respective ones of matching pairs of image patches between the first and second images. Determining or calculating the matching cost $\mu_{\alpha\beta}$ 630 will be discussed in greater detail below with reference to the cost module 216.

Each of the plurality of image patches 1-1, 1-2, 1-3, 1-4, 1-5 applied to the first image 203 represented by the first layer 601 are linked to a source vertex 0. The cost of each of the links to the source vertex 0 is zero as denoted by the dashed line. Each of the plurality of image patches 4-1, 4-2, 4-3, 4-4, 4-5 applied to the second image 203 represented by the fourth layer 604 are linked to a sink vertex 50. The cost of each of the links to the sink vertex 50 is zero as denoted by the dashed line.

With reference to FIGS. 2 and 6, the four-layer directed graph 214 is input to the cost module 216. The cost module 216 includes the detection cost module 218 and the matching cost module 220. The detection cost module 218 determines a detection cost 219 for each of the image patches 208 and 210 applied to the first and second images 203, 205, respectively. As will become apparent, the presence of the target object can be detected within an image patch (i.e., image patch is occupied) based on the detection cost of the respective image patch. The detection costs $\zeta_\alpha$ 610 and $\zeta_\beta$ 620 illustrated in FIG. 6 are represented by the detection costs 219 input to the cost flow module 222.

The detection cost module 218 can include a linear support vector machine (SVM) trained to determine whether each image patch applied to the first and second images is one of occupied and unoccupied based on the detection cost 219 of each image patch. The SVM applies a linear vector classifier to each of the image patches applied to the first and second images. In an exemplary embodiment, the linear vector classifier is applied to each of image patches 1, 2, 3, 4, 5 applied to the first and second images 203, 205, respectively, illustrated in FIGS. 4 and 5. The linear classifier includes a plurality of decision boundaries. Each decision boundary corresponds to a respective perspective of a potential target object.

For instance, a perspective of the potential target object can include an edge of a vehicle. The decision boundaries can include a linear weight vector and a predetermined bias detection threshold. The linear vector classifier applied to each of the image patches applied to the first image to determine the detection cost 219 associated with respective ones of the image patches applied to the first and second images 203, 205, respectively, can be expressed as follows:

$$\zeta(a) = w_j^T f(a) + b \quad [1]$$

wherein $\zeta(a)$ is a detection cost associated with one of the applied image patches, $w_j$ is a linear weight vector for j=1, . . . , J, f(a) corresponds to application of the linear vector classifier to a respective one of the applied image patches, and b is a bias detection threshold.

A miss detection rate of a target object present within the respective image patch not being detected is reduced as the bias detection threshold b is reduced. However, a false detection rate of the target object falsely detected as present within the respective image patch is increased as the bias detection threshold is reduced. In an exemplary embodiment, the predetermined bias detection threshold b is sufficiently low to avoid misdetection of the target object in respective ones of the image patches.

The magnitude of the linear vector classifier calculated in Equation [1] is directly proportional to the detection cost associated with the respective image patch. As such, $\zeta(a)$ can be either one of a negative detection cost and a positive detection cost. In other words, when the magnitude of the linear vector classifier is less than zero, a negative detection cost associated with the respective image patch is determined. Likewise, when the magnitude of the linear vector classifier is at least zero, a positive detection cost associated with the respective image patch is determined. Accordingly, the respective image patch is assigned as occupied when the negative detection cost is determined or the respective image patch is assigned as unoccupied when the positive detection cost is determined. A decision rule for assigning the respective image patch as one of occupied and unoccupied can be expressed as follows:

$$h(a) = \begin{cases} 1, & \zeta(a) < 0 \\ 0, & \zeta(a) \geq 0 \end{cases} \quad [2]$$

wherein h(a)=1 corresponds to the respective image patch assigned as occupied, and h(a)=0 corresponds to the respective image patch assigned as unoccupied.

A respective image patch assigned as occupied likely contains the target object. A respective image patch assigned as unoccupied likely contains background information. The lower the detection cost, i.e., the lower the negative detection cost, the higher the confidence that the respective image patch assigned as occupied contains the target object.

Referring to FIG. 6, Equation [1] is utilized to determine the detection costs $\zeta_\alpha$ 610 on each of the arcs between 1-1 and 2-1; 1-2 and 2-2; 1-3 and 2-3; 1-4 and 2-4; and 1-5 and 2-5. In an exemplary embodiment, each detection cost $\zeta_\alpha$ 610 is associated with the respective ones of the image patches 1, 2, 3, 4, 5 applied to the first image 203, illustrated in FIG. 4. In the exemplary embodiment, the arc between the image patches 1-3 and 2-3 (e.g., shaded) of the first and layers 601, 602, respectively, includes a negative detection cost. Therefore, each of the image patches 1-3 and 2-3 corresponding to the first and second layers 601, 602, respectively, applied to the first image 203 are assigned as occupied based on applying the linear vector classifier expressed in Equation [1] and the decision rule in Equation [2]. With reference to FIG. 4, the image patch 3 includes the target object.

Similarly, Equation [1] is utilized to determine the detection costs $\zeta_\beta$ 620 on each of the arcs between 3-1 and 4-1; 3-2 and 4-2; 3-3 and 4-3; 3-4 and 4-4; and 3-5 and 4-5. In an exemplary embodiment, each detection cost $\zeta_\beta$ 620 is associated with respective ones of the image patches 1, 2, 3, 4, 5 applied to the second image 205, illustrated in FIG. 5. In the exemplary embodiment, the arc between the image patch 3-2 and 4-2 (e.g., shaded) of the second layer 602 includes a negative detection cost. Therefore, each of the image patches 3-2 and 4-2 are assigned as occupied based on applying the vector classifier expressed in Equation [1] and decision rule in Equation [2]. With reference to FIG. 5, the image patch 2 includes the target object 415.

Referring back to FIG. 2, the matching cost module 220 determines a plurality of matching costs 221 each corresponding to respective ones of matching pairs of the image patches applied to the first and second images 203, 205, respectively. The matching costs $\mu_{\alpha\beta}$ 630 illustrated in FIG. 6 are represented by the matching costs 221 input to the cost flow module 222.

Referring to FIGS. 2 and 6, the matching cost module 220 first selects matching pairs of image patches between the first and second images. As will become apparent, the matching cost module 220 provides stereo matching of objects within the first and second images 203, 205, respectively, captured by the first and second camera devices 202, 204, respectively, of the binocular camera system 201. As aforementioned, arcs incident between enumerated image patches represented by the second and third layers 602, 603, respectively, represent possible matches between image patches applied to the first image 203 and image patches applied to the second image 205. Appearance information of each of the image patches applied to the first and second image 203, 205, respectively, is monitored. Specifically, appearance information of the enumerated image patches of the second and third layers 602, 603, respectively is monitored. Appearance information can include, but is not limited to, pixel matrices of each image, contrast, edges and shapes within a respective image patch. Furthermore, location information of each of the image patches applied to the first and second images 203, 205 is monitored. Specifically, location information of the enumerated image patches of the second and third layers 602, 603, respectively is monitored. Location information can include the location of the respective image patch in each of the images such as row and column indices within each of the corresponding image. Accordingly, each matching pair includes selected ones of the image patches applied to the first image and selected ones of the image patches applied to the second image having related appearance information and related location information. As illustrated in FIG. 6, the plurality of matching pairs include 2-2 and 3-2; 2-3 and 3-2; 2-3 and 3-3; 2-3 and 3-4; and 2-4 and 3-2.

In an exemplary embodiment, the determination that the image patches applied to the first and second images having related appearance information and related location information is based on respective predetermined thresholds. For instance, when the monitored location information of each of the selected image patches applied to the first and second images deviates by less than a predetermined location threshold, the location information between each of the selected image patches is deemed related. Similarly, when the monitored appearance information of each of the selected image patches applied to the first and second images deviates by less than a predetermined appearance threshold, the appearance information between each of the selected image patches is deemed related.

The matching cost module 220 further determines the plurality of matching costs 221 each corresponding to respective ones of the matching pairs of the image patches. The matching costs 221 are applied to the cost flow module 222. The location information of each of the selected image patches associated with each matching pair is monitored. The appearance information of each of the selected image patches associated with each matching pair is monitored. As aforementioned, the monitored appearance information can include monitored pixel matrices of each of the selected image patches associated with each matching pair and the monitored location information can include row and column indices within the corresponding image. Dissimilarity in the location information between each of the selected image patches associated with the each matching pair can be measured. Likewise, dissimilarity in the appearance information between each of the selected image patches associated with each matching pair can be measured. Accordingly, the plurality of matching costs 221, i.e., the matching costs $\mu_{\alpha\beta}$ 630, are determined based on the dissimilarity in the location information and the appearance information between each of the selected image patches associated with each matching pair. Determining the plurality of matching costs 221, i.e., the matching costs $\mu_{\alpha\beta}$ 630, each corresponding to respective ones of the matching pairs of image patches between the first and second images 203, 205, respectively, can be expressed as follows.

$$\mu_{\alpha\beta} = \frac{|x(a_\alpha)^T F x(a_\beta)|^2}{\theta_x^2} + \frac{|W(I(a_\alpha), p) - I(a_\beta)|^2}{\theta_I^2} \quad [3]$$

wherein $\mu_{\alpha\beta}$ is the matching cost, $x(a_\alpha)$ is location information of a selected image patch associated with a matching pair and applied to the first image, $x(a_\beta)$ is location information of a selected image patch associated with the matching pair and applied to the second image, $I(a_\alpha)$ is pixel matrices of the selected image patch associated with the matching pair and applied to the first image, $I(a_\beta)$ is pixel matrices of the selected image patch associated with the matching pair and applied to the second image, F(x) is a known fundamental matrix, derived from a camera calibration process, W(I,p) is a warping function, p is a parameter vector of the 3D position of the target object, $\theta_x$ is a tuning parameter for location matching, and $\theta_I$ is a tuning parameter for appearance matching.

The location information of the image patches includes the row and column indices within the corresponding image. It will be assumed that each of the first and second camera devices 202, 204, respectively, are first calibrated. The warping function (W(I,p) warps the image patch I based on the parameter vector p. The parameter vector p is the 3-D position of the target, including the object distance that is derived from the estimation of previous cycle. It will be appreciated that each of the matching costs 221, i.e., the matching cost $\mu_{\alpha\beta}$ 630, as expressed by Equation [3], are defined as a dissimilarity measure of appearance information and location information between each of the selected image patches associated with each matching pair. As such, the matching cost $\mu_{\alpha\beta}$ 630 corresponding to matching pair 3-2 and 2-3 illustrated in FIG. 6, is represented as the deviation from the epipolor line and dissimilarity measures of appearance.

Referring to FIGS. 2 and 6, the detection costs 219 and the matching costs 221 are input to the cost flow module 222. It will be understood that the detection costs 219 and the matching costs 221 can be determined simultaneously. The cost flow module 222 generates or determines at least one cost flow path 224 from the source vertex 0 of the first image 203 to the sink vertex 50 of the second image 205 based on the detection costs 219 and the matching costs 221. In an exemplary embodiment, a minimum cost flow (MCF) is applied to the four-layer directed graph 214, allowing for accurate and robust tracking of a target object without having to extract three-dimensional images from disparity maps.

The MCF first monitors a plurality of cost flow paths from the source vertex 0 of the first image to the sink vertex of the second image 205. Each cost flow path 224 includes one of the detection costs $\zeta_\alpha$ 610, one of the detection costs $\zeta_\beta$ 620 and one of the matching costs $\mu_{\alpha\beta}$ 630. Each cost flow path 224 is segmented into a plurality of units of shipment f, each unit of shipment f including one of: one of the detection costs $\zeta\alpha$ 610 and $\zeta_\beta$ 620 and one of the matching costs $\mu_{\alpha\beta}$ 630. A total accumulated cost for each cost flow path is determined based on a sum of each unit of shipment segmented from each respective cost flow path. A least cost flow path is selected based on the cost flow path 224 having the lowest a total accumulated cost. Discussed in greater detail below with reference to the tracking module 226, the target object is tracked based on the least cost flow path. Selecting the least cost flow path, i.e., MCF, based on the cost flow path having the lowest total accumulated cost can be expressed as follows:

$$\text{Minimize } T = \Sigma_{(u,v) \in E} c_{uv} f_{uv} \quad [4]$$

subject to, $$\sum_{v:(u,v) \in E} f_{uv} - \sum_{v:(u,v) \in E} f_{vu} = \begin{cases} f & \text{for } u = s \\ 0 & \text{for } u \in V - \{s, t\} \\ -f & \text{for } u = t \end{cases}$$

$$f_{uv} \in \{0, 1\} \text{ for } (u, v) \in E$$

$$0 \le f \le f_{max}$$

wherein u,v are two vertices (first layer 601, second layer 602, third layer 603, and fourth layer 604), s is the source vertex 0, t is the sink vertex 50, T is the least cost flow path, e.g., MCF, $f_{max}$ is the maximum units of flow from s to t, (u,v)∈E is an arc incident from the vertex u to the vertex v, and E is the set of all arcs.

Equation [4] demonstrates that the units of shipment f can be regarded as the number of paths from s (e.g., source vertex 0) to t (e.g., sink vertex 50). Routines implanted within the cost flow module 222 can be utilized to compute the least cost flow path of Equation [4], wherein the routines rely on the number of units of shipment f being known. However, if the number of units of shipment f is not known, a search of every admissible value of f can be accomplished. Alternative embodiments can also include binary searches.

In an exemplary embodiment, with reference to FIG. 6, the least cost flow path (e.g., minimum cost flow path) from the source vertex 0 to the sink vertex in the four-layer directed graph 214 includes image patch enumerated vertices 1-3, 2-3, 3-2, 4-2. As demonstrated by Equation [1] the arc between vertices 1-3 and 2-3 is a negative detection cost and the arc between 3-2 and 4-2 is also a negative detection cost. As demonstrated by Equation [3] the matching cost $\mu_{\alpha\beta}$ 630 corresponding to matching pair 3-2 and 2-3 has a least matching cost. As such applying the MCF to the four-layer directed graph 214 utilizing Equation [4], the least cost flow path, e.g., the cost flow path having the lowest total accumulated cost, is represented as source vertex 0→1-3→2-3→3-2→4-2→sink vertex 50.

It will be appreciated that each of the matching costs 221, i.e., the matching cost $\mu_{\alpha\beta}$ 630, as expressed by Equation [3], are defined as a dissimilarity measure of appearance information and location information between each of the selected image patches associated with each matching pair. As such, the matching cost $\mu_{\alpha\beta}$ 630 corresponding to matching pair 3-2 and 2-3 illustrated in FIG. 6, is represented as the deviation from the epipolor line and dissimilarity measures of appearance.

The least cost flow path 224 is input to the tracking module 226 where the target object is tracked. Selecting the least cost flow path to track the target object utilizing first and second images 203, 205, respectively, captured from the first and second camera devices 203, 205, respectively, having a wide baseline increases the accuracy of range estimation to the target object when a flat ground assumption is violated. As aforementioned, range estimation to target objects degrades quadratically as range to the target object increases when the flat ground assumption is violated using monocular camera devices. Tracking the target object can include tracking range to the target object and tracking velocity of the target object. Accordingly, tracked range 227 to the target object and tracked velocity 229 of the target object are each input to the vehicle control module 230. The vehicle control module can autonomously or semi-autonomously control the source vehicle based on the tracked range 227 and the tracked velocity. For instance, the vehicle control module 230 can issue a command to apply braking to the source vehicle if it is determined that the target object, e.g., leading target vehicle, is too close to the source vehicle.

While the embodiments and examples discussed herein include tracking one target object, e.g., leading target vehicle 415 illustrated in FIGS. 4 and 5, the object detection and matching (ODM) module 200 is equally applicable to track multiple target objects.

Figure 7:
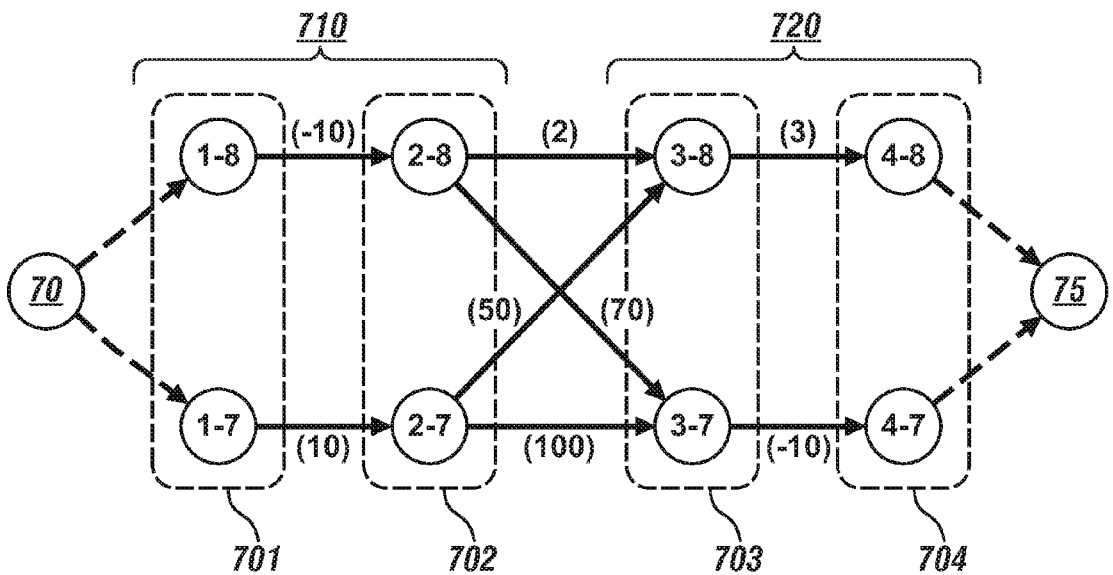
FIG. 7 illustrates an exemplary four-layer directed graph illustrating two cost flow paths from a source vertex of a first image to a sink vertex of a second image, in accordance with the present disclosure.

Referring to FIG. 7, a four-layer directed graph 700 is depicted including a first image 710 having two layers including a first layer 701 and a second layer 702. The first image 710 can be a driver-side image obtained from a driver-side camera device mounted proximate a driver-side A-pillar. The four-layer directed graph 700 further includes a second image 720 having two layers including a third layer 703 and a fourth layer 704. The second image 720 can be a passenger-side image obtained from a passenger-side camera device mounted proximate a passenger-side A-pillar. Two image patches applied to the first image 710 are enumerated as 1-7, 1-8 for all possible image patches of the first layer 701 and are enumerated as 2-7, 2-8 for all possible image patches of the second layer 702. Two image patches applied to the second image 720 are enumerated as 3-7, 3-8 for all possible image patches of the third layer 703 and are enumerated as 4-7, 4-8 for all possible image patches of the fourth layer 704. The four-layer directed graph 700 further includes a source vertex 70 linked to each of 1-7, 1-8 of the first layer 701 and a sink vertex 75 linked to each of 4-7, 4-8 of the second layer 704.

As aforementioned, a plurality of detection costs can be determined utilizing Equation [1]. Each detection cost is associated with respective ones of the image patches applied to the first and second images. The arc between 1-8 and 2-8 includes a detection cost of (−10). Hence, the respective image patch 1-8 is likely occupied because a negative detection cost is determined. The arc between 3-8 and 4-8 is (3). Hence, the respective image patch 3-8 is likely unoccupied because a positive detection cost is determined. The arc between 1-7 and 2-7 is (10). The arc between 3-7 and 4-7 is (−10).

As aforementioned, a plurality of matching costs can be determined utilizing Equation [3]. Each matching cost corresponds to respective ones of matching pairs of image patches between the first and second images. The arc between 2-8 and 3-7 includes a matching cost of (70). The arc between 2-8 and 3-8 includes a matching cost of (2). The arc between 2-7 and 3-8 includes a matching cost of (50). The arc between 2-7 and 3-7 includes a matching cost of (100).

Applying the MCF utilizing Equation [4] to the exemplary four-layer directed graph 700 of FIG. 7, determines a least cost flow path e.g., the cost flow path having the lowest total accumulated cost, represented as source vertex 70→1-8→2-8→3-8→4-8→sink vertex 75. It will be appreciated that determining the least cost flow path allows for gap bridging between 2-8 and 3-8 because the detection cost associated with the image patch 3-8 is assigned as unoccupied due to the positive detection cost of (3) determined on the arc between 3-8 and 4-8, whereas the detection cost associated with the image patch 1-8 is assigned as occupied due to the negative detection cost of (−10) determined on the arc between 1-8 and 2-8. However, there is a relatively small matching cost of (2) determined on the arc between 2-8 and 3-8. Therefore, even though the detection cost on the arc between 3-8 and 4-8 is positive, there is cost flow path from the source vertex 70 to the sink vertex 75 having a total accumulated cost that is negative.

Furthermore, the least cost flow path represented as represented as source vertex 70→1-8→2-8→3-8→4-8→sink vertex 75 allows for false object detection removal. While the detection cost associated with 3-7 is assigned as occupied due to the negative detection cost of (−10) determined on the arc between 3-7 and 4-7, the image patch 3-7 is isolated from the image patches in the first image 710, as indicated by the large matching cost value on the arc between 2-8 and 3-7 and the large matching cost value on the arc between 2-7 and 3-7. Accordingly, any cost flow path containing 3-7 would result in a positive total accumulated cost. As such, 3-7 is removed as it is likely a falsely detected object.

Figure 8:
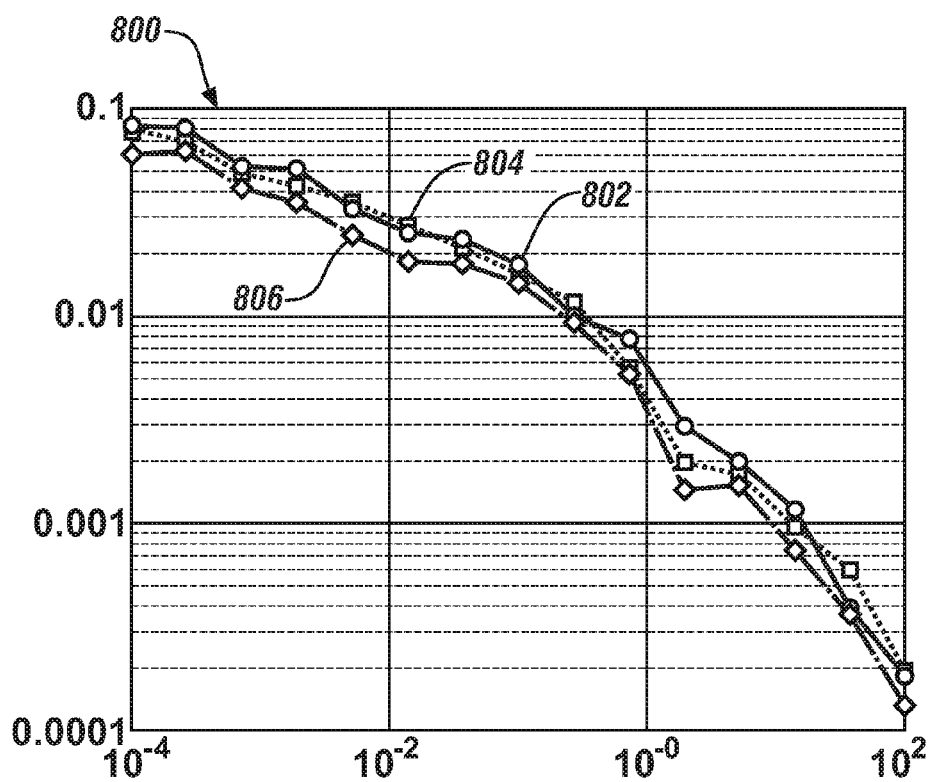
FIG. 8 illustrates experimental and derived data from a first camera device, a second camera device and a binocular camera system, depicting missed object detection as a function of false object detection per frame, in accordance with the present disclosure.

FIG. 8 graphically illustrates a plot 800 of experimental and derived data of a driver-side monocular camera device, a passenger-side monocular camera device and a binocular camera system, depicting a varying bias detection threshold as a function of false object detection rate per frame. It will be understood that the bias detection threshold corresponds to the bias detection threshold b of Equation [1]. The horizontal axis denotes false object detection rate per frame and the vertical axis denotes miss detection rate per frame. Profile 802 denotes the false object detection rate of the driver-side camera device as the bias detection threshold is varied. Profile 804 denotes the false object detection rate of the passenger-side camera device as the bias detection threshold is varied. Profile 806 denotes the false object detection rate of the binocular camera system 201 of FIG. 3 as the bias detection threshold is varied. It will be appreciated that the profiles 802,

804, 806 are receiver operating characteristic (ROC) curves generated by a linear support vector machine (SVM) utilizing Eq. [1], wherein the bias detection threshold b is varied. As the bias detection threshold b is decreased, the false object detection rate per frame increases. The profile 806 denoting the false object detection rate of the binocular camera system is more robust than the driver-side and passenger-side camera systems as demonstrated by a 10% decrease in miss detection rate.

Figure 9:
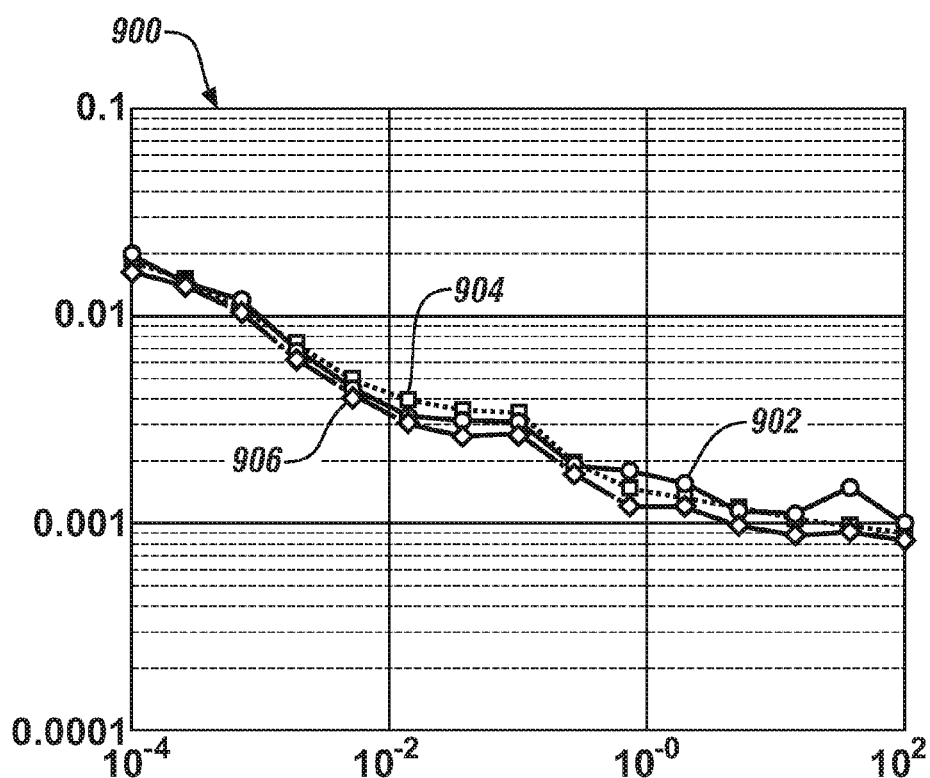
FIG. 9 illustrates experimental and derived data from a first camera device, a second camera device and a binocular camera system, depicting multiple object detection precision as a function of false object detection per frame, in accordance with the present disclosure.

FIG. 9 graphically illustrates a plot 900 of experimental and derived data of a driver-side monocular camera device, a passenger-side monocular camera device and a binocular camera system, depicting multiple object detection precision (MODP) as a function of false object detection rate per frame. The horizontal axis denotes false object detection rate per frame and the vertical axis denotes MODP. It will be appreciated that the MODP is a performance metric providing an indicator of spatial overlap between manually labeled image patches, e.g., ground truth determined utilizing a radar device, and applied image patches output from a linear support vector (SVM) machine. The MODP therefore depicts an overall spatial precision of detection in a frame. Profile 902 denotes the MODP as a function of false object detection rate of the driver-side camera device. Plot 904 denotes the MODP as a function of false object detection rate of the passenger-side camera device. Plot 906 denotes the MODP as a function of false object detection rate of the binocular camera system. The profile 906 denoting the MODP as a function of false object detection rate of the binocular camera system is more robust than the driver-side and passenger-side monocular camera devices as demonstrated by a 10% decrease in MODP.

Figure 10:
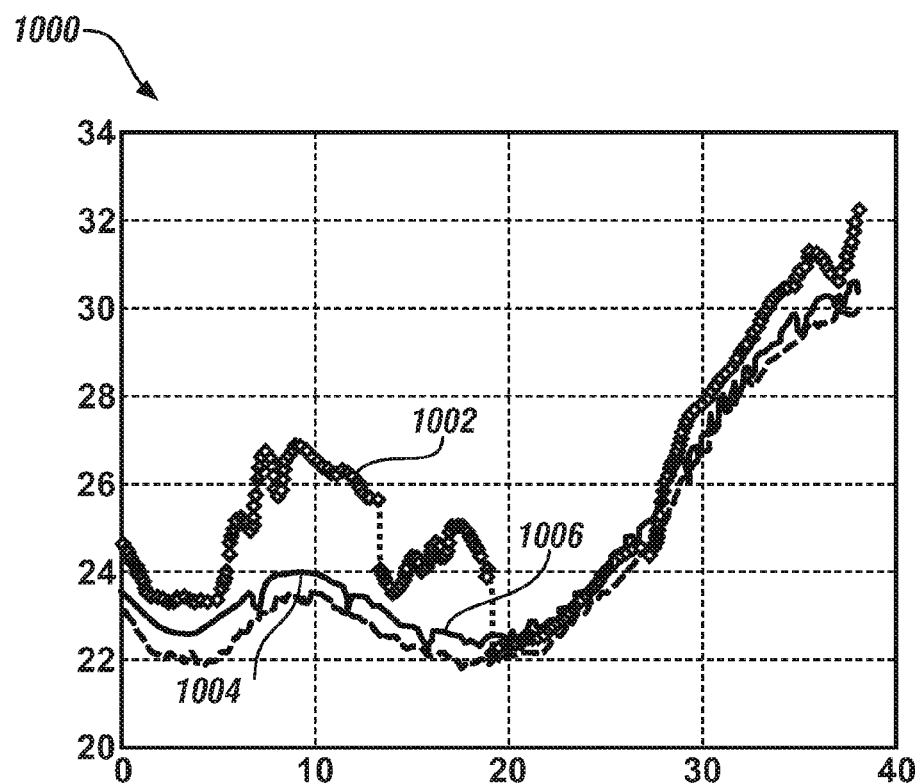
FIG. 10 graphically illustrates experimental and derived data from a monocular camera device, a radar device and a binocular camera system, depicting estimation of range to a target object, in accordance with the present disclosure.

FIG. 10 graphically illustrates a plot 1000 of experimental and derived data of a monocular camera device, a radar device and a binocular camera system, depicting range or distance to a target object over time. The target object is a leading target vehicle on a roadway. The horizontal axis denotes a test time in seconds and the vertical axis denotes distance in meters. Profile 1002 denotes the range to the target object detected or measured utilizing the monocular camera device. Profile 1004 denotes the range to the target object detected or measured utilizing the binocular camera system. Profile 1006 denotes the range to the target objected detected or measured utilizing the radar device. As aforementioned, the radar device has an accuracy of measurement within decimeters, and therefore, functions as a ground truth or actual range. The profile 1004 denoting the range to the target object detected or measured utilizing the binocular camera system demonstrates range measurements having increased accuracy compared to that of the monocular camera device shown by profile 1002.

Figure 11:
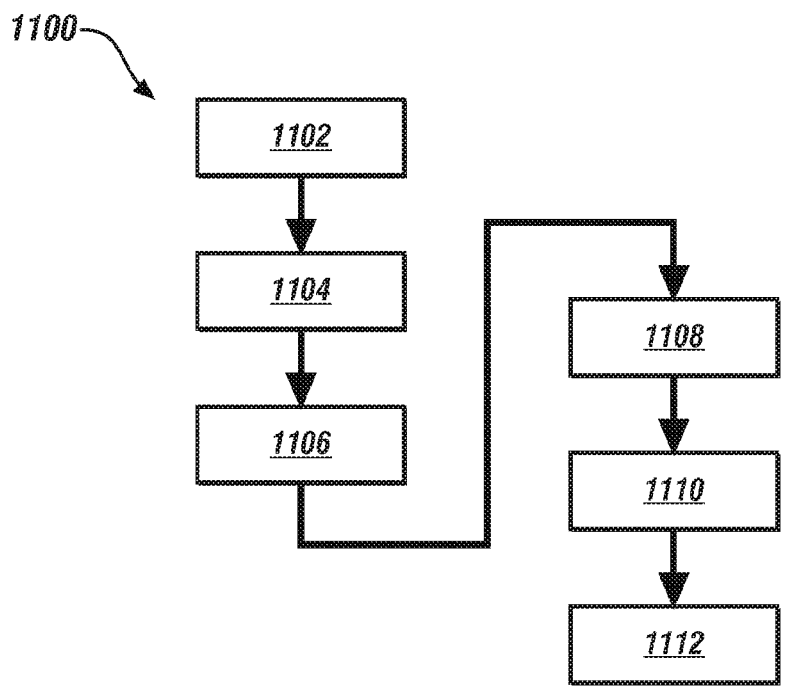
FIG. 11 an exemplary flowchart for tracking a target object utilizing a binocular camera system, in accordance with the present disclosure.

FIG. 11 illustrates a flow chart 1100 for tracking a target object utilizing a binocular camera system associated with the binocular camera system 201 and the ODM 200 of FIG. 2 in accordance with the present disclosure. Table 1 is provided as a key to FIG. 11 wherein the numerically labeled blocks and the corresponding functions are set forth as follows.

TABLE 1

| BLOCK | BLOCK CONTENTS |
|---|---|
| 1102 | Capturing first and second images |
| 1104 | Applying a plurality of image patches to each of the first and second images. |
| 1106 | Determining a plurality of detection costs each associated with respective ones of the image patches applied to the first and second images. |
| 1108 | Determining a plurality of matching costs each corresponding to respective ones of matching pairs of image patches between the first and second images. |

TABLE 1-continued

| BLOCK | BLOCK CONTENTS |
|---|---|
| 1110 | Determining at least one cost flow path from a source vertex of the first image to a sink vertex of the second image based on the detections costs and the matching costs. |
| 1112 | Tracking the target object based on the at least one cost flow path. |

The flowchart 1100 utilizes the aforementioned binocular camera system 201 and the ODM module 202 of FIG. 2. The flowchart starts at block 1102 where first and second images are captured. The first image is captured by a first camera device of the binocular camera system and the second image is captured by a second camera device of the binocular camera system. The first and second camera devices are separated by a wide baseline, wherein the first camera device can be mounted proximate a driver-side a-pillar and the second camera device can be mounted proximate a passenger-side A-pillar. The flowchart proceeds to block 1104 where a plurality of image patches are applied to each of the first and second images. Each of the image patches can be rectangular boxes having a discrete size and location. The image patches can be referred to as object candidates describing that the image patch can be one of occupied with a target object and unoccupied by the target object. The flowchart 1100 proceeds to block 1106.

Block 1106 determining a plurality of detection costs each associated with respective ones of the image patches applied to the first and second images. If a detection cost associated with a respective image patch is negative, the image patch is assigned as occupied and likely contains the target object therein. If the detection cost associated with the respective image patch is positive, the image patch is assigned as unoccupied and likely does not contain the target object therein. The flowchart proceeds to block 1108

Block 1108 determines a plurality of matching costs each corresponding to respective ones of matching pairs of image patches between the first and second images. Each matching pair includes selected ones of image patches applied to the first image and selected ones of the image patches applied to the second image having related appearance information and related location. Dissimilarity is measured in the appearance information between each of the selected image patches associated with each matching pair. The plurality of matching costs are determined based on the dissimilarity in the location information and the dissimilarity in the appearance information between each of the selected image patches associated with each matching pair. The flowchart 1100 proceeds to block 1110.

Block 1110 determines at least one cost flow path from a source vertex of the first image to a sink vertex of the second image based on the detection costs and the matching costs. A cost flow path having the lowest total accumulated cost from the source vertex to the sink vertex is selected as a least cost flow path. The flowchart proceeds to block 1112 where the target object is tracked based on the at least one cost flow path, or more specifically, the target object is tracked based on the least cost flow path having the lowest total accumulated cost when more than one cost flow paths exist.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for tracking a target object utilizing a binocular camera system, comprising:
   capturing first and second images, the first image captured from a first camera device and the second image captured from a second camera device;
   generating a four-layer layered graph, comprising;
      generating a first layer of nodes and a second layer of nodes from the first captured image, each node of the first layer and the second layer comprising a candidate patch,
      identifying node pairs comprising matched nodes from the first layer and the second layer, with each node pair from the first layer and the second layer representing an image patch including an object of interest in the first captured image,
      generating a third layer of nodes and a fourth layer of nodes from the second captured image, each node of the third layer and the fourth layer comprising a candidate patch, and
      identifying node pairs comprising matched nodes from the third layer and the fourth layer, with each node pair from the third layer and the fourth layer representing an image patch for an object of interest in the second captured image;
   using a pixel-less, patch based analysis to determine a presence of the target object in each of the image patches, the analysis comprising:
      comparing each of the patches to an object template, and
      determining a plurality of detection costs associated with respective ones of the image patches based upon the comparing;
   among the image patches determined to include the target object, determining a plurality of matching costs for each matching pair of image patches between the second layer and the third layer;
   determining at least one cost flow path from a source vertex linked to the image patches of the first layer to a sink vertex linked to the image patches of the fourth layer based on the detection costs and the matching costs; and
   tracking the target object based on the at least one minimal cost flow path.

2. The method of claim 1 wherein tracking the target object comprises at least one of:
   tracking a range to the target object; and
   tracking a velocity of the target object.

3. The method of claim 1 wherein the first camera device is mounted on one side of a source vehicle windshield and the second camera device is mounted on a second side of the source vehicle windshield.

4. The method of claim 1 wherein generating the layers of nodes comprises:
   defining a predetermined number of image patches, each image patch comprising a a rectangle shaped portion of one of the layers.

5. The method of claim 1 wherein determining the plurality of detection costs each associated with respective ones of the image patches comprises:
   applying a linear vector classifier comprising a plurality of decision boundaries to each of the image patches applied to the first layer, the second layer, the third layer, and the fourth layer, each decision boundary corresponding to a respective perspective of a potential target object; and
   one of
      when the linear vector classifier indicates a cost value less than zero, determining a negative detection cost associated with the respective image patch, and
      when the linear vector classifier indicates a cost value greater than zero, determining a positive detection cost associated with the respective image patch.

6. The method of claim 5 further comprising:
   assigning the respective image patch as occupied when the associated negative detection cost is determined; and
   assigning the respective image patch as unoccupied when the associated positive detection cost is determined.

7. The method of claim 5 wherein the vector classifier comprising the decision boundaries comprises a linear weight vector and a predetermined bias detection threshold.

8. The method of claim 1 wherein identifying node pairs comprises:
   monitoring location information of each of the candidate patches;
   monitoring appearance information of each of the candidate patches; and
   selecting said node pairs from the candidate patches based upon threshold matching appearance information and location information.

9. The method of claim 8 further comprising:
   when the monitored location information of each of the candidate patches deviates by less than a predetermined location threshold, deeming the location information as threshold matching.

10. The method of claim 8 further comprising:
   when the monitored appearance information of each of the candidate patches deviates by less than a predetermined appearance threshold, deeming the appearance information as threshold matching.

11. The method of claim 1 wherein determining the plurality of matching costs comprises:
   monitoring location information of each of the image patches associated with each selected matching pair;
   monitoring appearance information of each of the image patches associated with each selected matching pair;
   measuring dissimilarity in the location information between each of the image patches associated with each selected matching pair;
   measuring dissimilarity in the appearance information between each of the image patches associated with each selected matching pair; and
   determining the plurality of matching costs based on the dissimilarity in the location information and the dissimilarity in the appearance information between each of the image patches associated with each selected matching pair.

12. The method of claim 1 wherein determining the at least one cost flow path from the source vertex to the sink vertex comprises:
   monitoring a plurality of cost flow paths from the source vertex to the sink vertex;
   segmenting each cost flow path into a plurality of units of shipment, each unit of shipment comprising one of: one of the detections costs and one of the matching costs;
   determining a total accumulated cost for each cost flow path based on a sum of each unit of shipment segmented from each respective cost flow path; and
   selecting a least cost flow path based on the cost flow path having the lowest total accumulated cost.

13. The method of claim 9 wherein the least cost flow path comprises a negative total accumulated cost.

14. Apparatus for tracking a target object utilizing a binocular camera system, comprising:

a binocular camera system comprising a first camera device and a second camera device, the first camera device mounted upon a first end of a source vehicle windshield and the second camera device is mounted upon a second end of the source vehicle windshield; and a computerized object detection and matching module including programming configured to:
  capture first and second images, the first image captured from the first camera device and the second image captured from the second camera device;
  generate a four-layer layered graph, comprising:
    generating a first layer of nodes and a second layer of nodes from the first captured image, each node of the first layer and the second layer comprising a candidate patch,
    identifying node pairs comprising matched nodes from the first layer and the second layer, with each node pair from the first layer and the second layer representing an image patch including an object of interest in the first captured image;
    generating a third layer of nodes and a fourth layer of nodes from the second captured image, each node of the third layer and the fourth layer comprising a candidate patch, and
    identifying node pairs comprising matched nodes from the third layer and the fourth layer, with each node pair from the third layer and the fourth layer representing an image patch for an object of interest in the second captured image;
  use a pixel-less, patch based analysis to determine a presence of the target object in each of the image patches, the analysis comprising:
    comparing each of the patches to an object template, and
    determining a plurality of detection costs associated with respective ones of the image patches based upon the comparing;
  among the image patches determined to include the target object, determine a plurality of matching costs for each matching pair of image patches between the second layer and the third layer;
  determine at least one cost flow path from a source vertex linked to the image patches of the first layer to a sink vertex linked to the image patches of the fourth layer based on the detection costs and the matching costs; and
  track the target object based on the at least one minimal cost flow path.

* * * * *